June 12, 1923.

G. E. ANDERSON

ADJUSTABLE KEEPER PLATE

Filed June 21, 1922

1,458,637

G. E. Anderson
INVENTOR

BY Victor J. Evans
ATTORNEY

Patented June 12, 1923.

1,458,637

UNITED STATES PATENT OFFICE.

GEORGE E. ANDERSON, OF MONTPELIER, VERMONT.

ADJUSTABLE KEEPER PLATE.

Application filed June 21, 1922. Serial No. 569,998.

*To all whom it may concern:*

Be it known that I, GEORGE E. ANDERSON, a citizen of the United States, residing at Montpelier, in the county of Washington and State of Vermont, have invented new and useful Improvements in Adjustable Keeper Plates, of which the following is a specification.

My present invention has reference to a latch keeper especially designed for use in connection with the latches of automobile doors.

My object is to produce a keeper which shall be of an adjustable nature whereby the same can be readily brought to proper engagement by the latch and whereby rattling incident to a loose connection between the latch and keeper of an automobile door will be entirely overcome.

The drawing which accompanies and forms part of this application, illustrates a satisfactory embodiment of the improvement reduced to practice, and wherein:—

Figure 1:
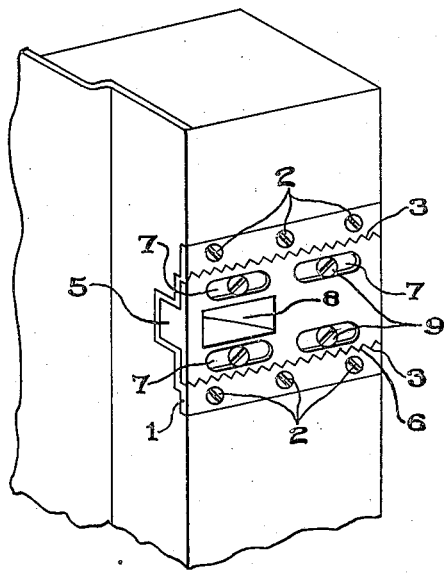
Figure 1 is a perspective view of a keeper in accordance with this invention.
Figure 2:
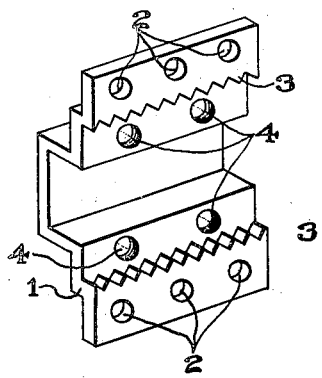
Figure 2 is a plan view of the attaching plate.
Figure 3:
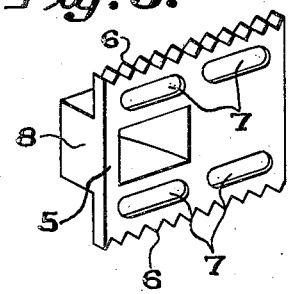
Figure 3 is an inner face view of the latch carrying plate.

As disclosed by the drawing, I employ two plates, the inner plate being indicated by the numeral 1, and having at suitable intervals reamed openings for the reception of screws 2. The plate 1, in a line with its longitudinal edges is formed with outwardly extending inwardly directed fine teeth 3. The plate 1, inward of the respective series of teeth 3 is provided with threaded openings 4.

The latch keeper plate is indicated by the numeral 5, and is of a width approximately equalling the distance between the outer toothed portion of the plate 1. The latch plate has its edges provided with series of fine teeth 6 designed to coengage with the teeth 3 when the plate 5 is arranged over the plate 1 between the teeth thereof. The plate 5 is also provided with elongated openings 7 respectively designed to be arranged over the threaded openings 4 in the plate 1. The plate 5 is centrally formed adjacent one of its edges with a keeper socket 8 that is designed to the slidable latch of an automobile door or the like. Preferably the longitudinal walls provided by the openings 7 are beveled, and passing through these openings there are screw members whose shanks enter the threaded openings 4, and whose heads 9 contact with the referred to beveled walls. The screws exert a binding action upon the plate 5, forcing the teeth thereof into engagement with the teeth on the plate 1, and in this manner it will be noted that the socket carrying plate 5 may be securely sustained adjusted on the plate 1.

Having described the invention, I claim:—

An adjustable keeper, comprising a fixed plate having outwardly projecting inwardly directed teeth adjacent to the edges thereof and having threaded openings inward of said teeth, a second plate having its edges toothed to be received between the toothed portion of the first mentioned plate to co-engage with the teeth thereof, said second mentioned plate having a latch receiving socket and elongated openings to aline with the threaded openings of the first mentioned plate, and headed bolts passing through these openings to bind the plates together.

In testimony whereof I affix my signature.

GEORGE E. ANDERSON.